B. Slusser.
Excavator.
N°60,268. Patented Dec. 4, 1866.
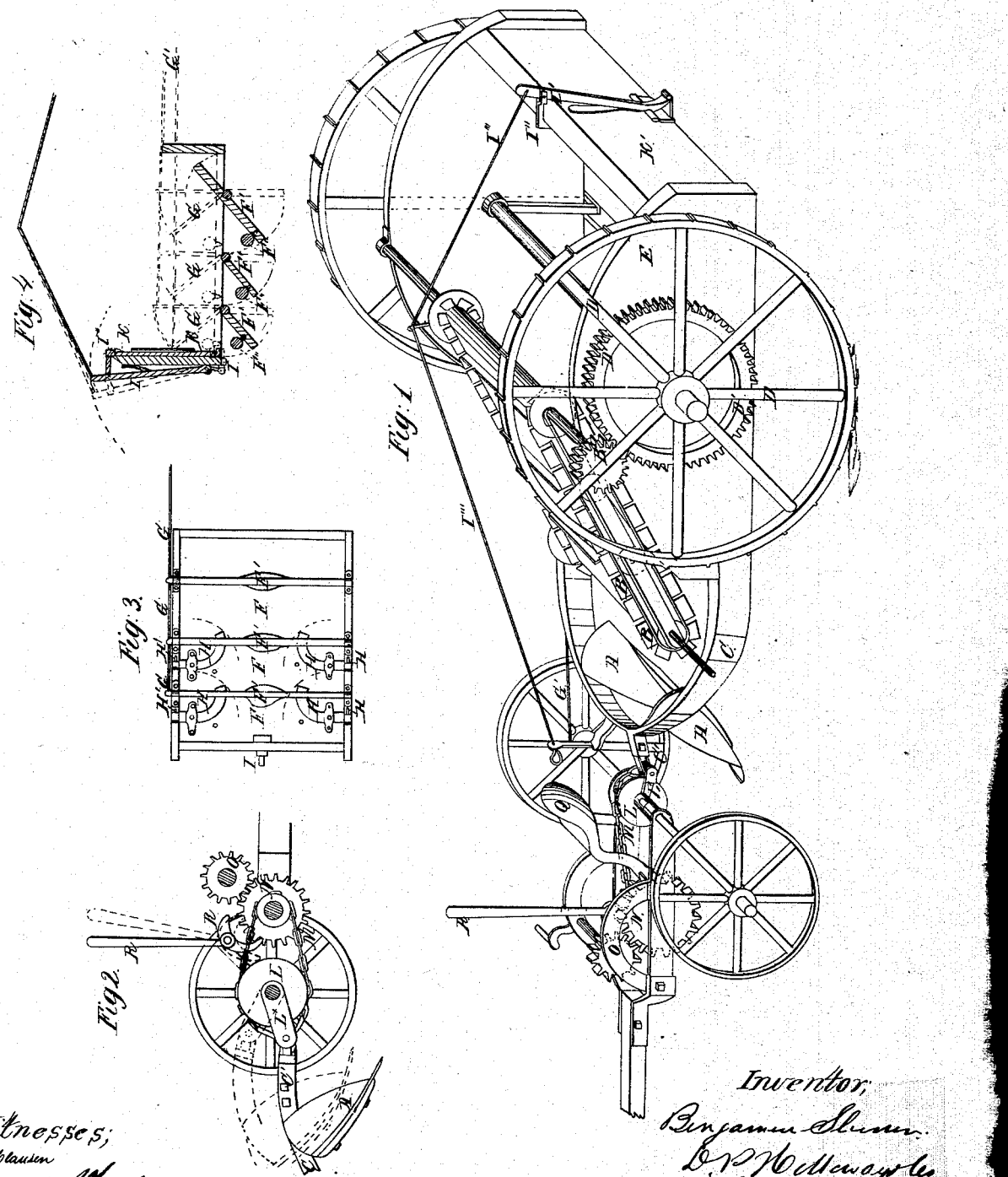
Witnesses:
Inventor,
Benjamin Slusser

United States Patent Office.

IMPROVED EXCAVATOR.

BENJAMIN SLUSSER, OF SIDNEY, OHIO.

Letters Patent No. 60,268, dated December 4, 1866.

SPECIFICATION.

TO ALL WHOM IT MAY CONCERN:

Be it known that I, BENJAMIN SLUSSER, of Sidney, in the county of Shelby, and State of Ohio, have invented a new and useful improvement in Machines for Excavating and Loading Earth; and I do hereby declare that the following is a full, clear, and exact description of the same, reference being had to the annexed drawings, making part of this specification, in which—

Figure 1 is a perspective view.
Figure 2 is a vertical longitudinal section of the fore part.
Figure 3 is a plan view of the dirt cart; and
Figure 4, a vertical section of the same.

The same letters are employed in the indication of identical parts in the several figures.

C is an excavating shovel or scoop, having a sharp projecting and pointed bottom set in an inclination, and vertical sides for the purpose of retaining the earth taken up upon the projecting point of the shovel. The earth, raised over it as the shovel passes through the ground, falls upon the endless apron B, which is formed with transverse ribs for the purpose of retaining the earth falling upon it. This apron is made of leather or other close material which will retain the earth falling upon it. The earth is raised upon the apron by power derived from the wheels D, on the spokes of which I attach a spur-wheel D', working into a pinion B', around the shaft of which the endless chain B is placed, the other end passing over a shaft which it revolves as it is turned. The earth falls from the upper end of the endless apron B into the cart body E, which, when loaded, is driven to the point where the earth is to be deposited. In order to do this the shovel A is raised from the ground by mechanism to be hereafter described. The bottom of the box or body E is made with a series of trap doors F F F, suspended upon rods F' F' F', made to turn freely in the boxes in which they are suspended. Weights F''' are attached to the doors to secure their prompt falling when released. To the rods F' I attach the levers G, at right angles to the rods, and parallel with one another. The rope G' unites the ends of all the levers G, and is carried forward to the seat for the driver, who, by drawing on the cord, can close all the doors at the same time. As the doors are closed the curved latches H, projecting beyond the ends of the doors, strike against inclined pins H' in the bottom of the sides of the box E, which, pressing against the sides of the latches, (which are centrally pivoted,) project the opposite ends so that they sustain the unsupported side of the next door. The door nearest the end of the box is supported, when raised, by the latch I, which is hinged to the vertical arm I', underneath which a spring pressing outwardly retains the latch in place until withdrawn by the cord I''' fastened to the top of the lever I', and also carried forward to the driver's seat. The latch I being withdrawn, the door falls; at the same time the L-formed arm I'', attached to the lever I', falls over the side of the box, and holds the latch I retracted, so as to permit the door to be raised. When the door is raised as described, it strikes against the foot of the bar K, the upper end of which rests under the hook on the end of arm I''; this bar being raised, throws the hook from the end of the box at K, and releases the latch, which immediately shoots under the door. The box is carried upon the two wheels D. The frame C' is carried forward to a point in front, where it is suspended immediately in front of the shovel by the arm C' to the front axle in the following manner: On the axle is the spool L, to which the lugs L' are attached, through which a bolt passes, uniting them to arm C'. The revolution of the spool will thus cause the end of the frame carrying the shovel to be raised or depressed, as desired. This is effected by the chain M passing around the spool and around the axle of the wheel N, which is driven by the pinion O, on the other end of the shaft of which is the crank P. By turning this crank the height of the shovel is regulated by the driver on the seat Q. R is a claw for holding the shovel in position.

What I claim as my invention, and desire to secure by Letters Patent, is—

1. The combination of the spool L, chain M, wheel N, pinion O, and crank P, when used to regulate the height of the shovel A, adjustably sustained by the front axle, substantially as and for the purpose set forth.

2. In the combination with the driver's seat Q, I claim the cord I''' and rope G', or their equivalents, for opening and closing from the driver's seat the hinged doors F in the bottom of the box E, substantially as set forth.

3. The doors F, latches H, and inclined faces H', in combination, when constructed and arranged substantially as set forth.

4. In combination with the doors F, I claim the latch I, lever I', arm I'', and bar K, substantially as set forth.

In testimony whereof I have signed my name to this specification in the presence of two subscribing witnesses.

BENJAMIN SLUSSER.

Witnesses:
E. M. GLICK,
S. ALEX. LECKEY.